(12) United States Patent
Natu et al.

(10) Patent No.: US 8,146,150 B2
(45) Date of Patent: Mar. 27, 2012

(54) SECURITY MANAGEMENT IN MULTI-NODE, MULTI-PROCESSOR PLATFORMS

(75) Inventors: Mahesh S. Natu, Portland, OR (US); Sham Datta, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1106 days.

(21) Appl. No.: 11/968,128

(22) Filed: Dec. 31, 2007

(65) Prior Publication Data
US 2009/0172806 A1 Jul. 2, 2009

(51) Int. Cl.
*G06F 7/04* (2006.01)
(52) U.S. Cl. .................. 726/16; 726/1; 726/3; 713/100; 713/164; 712/22
(58) Field of Classification Search .................. 713/100, 713/164; 726/1, 3, 16; 712/22
See application file for complete search history.

(56) References Cited

U.S. PATENT DOCUMENTS

| | | | |
|---|---|---|---|
| 2005/0273602 A1* | 12/2005 | Wilson et al. | 713/164 |
| 2007/0118743 A1* | 5/2007 | Thornton et al. | 713/164 |
| 2008/0016127 A1* | 1/2008 | Field | 707/202 |
| 2009/0055641 A1* | 2/2009 | Smith | 713/100 |

* cited by examiner

*Primary Examiner* — Taghi Arani
*Assistant Examiner* — Jason Lee
(74) *Attorney, Agent, or Firm* — Buckley, Maschoff & Talwalkar LLC

(57) ABSTRACT

Multi-node and multi-processor security management is described in this application. Data may be secured in a TPM of any one of a plurality of nodes, each node including one or more processors. The secured data may be protected using hardware hooks to prevent unauthorized access to the secured information. Security hierarchy may be put in place to protect certain memory addresses from access by requiring permission by VMM, OS, ACM or processor hardware. The presence of secured data may be communicated to each of the nodes to ensure that data is protected. Other embodiments are described.

7 Claims, 3 Drawing Sheets

| Address Range | Requestor | Conditions for granting access |
|---|---|---|
| 0xFED2_XXXX (Private Space) 0xFED4_2XXX (TPM Locality 2) | Processor Hardware | Unconditionally |
| | Intel Authenticated Code Module (ACM) | If authorized by processor hardware by special command |
| | Virtual Machine Monitor (VMM) | If authorized by processor hardware and Intel ACM |
| | Guest OS | If authorized by processor hardware and Intel ACM and VMM |
| 0xFED3_XXXX (Public Space) 0xFED4_0XXX (TPM Locality 0) | Processor Hardware, VMM, Intel ACM | Unconditionally |
| | Guest OS | If authorized by VMM via CPU page table mechanism |
| 0xFED4_4XXX (TPM Locality 4) | Processor Hardware | Unconditionally |
| | VMM, Intel ACM, Guest OS | Never |

| Address Range | Requestor | Conditions for granting access |
|---|---|---|
| 0xFED2_XXXX (Private Space) 0xFED4_2XXX (TPM Locality 2) | Processor Hardware | Unconditionally |
| | Intel Authenticated Code Module (ACM) | If authorized by processor hardware by special command |
| | Virtual Machine Monitor (VMM) | If authorized by processor hardware and Intel ACM |
| | Guest OS | If authorized by processor hardware and Intel ACM and VMM |
| 0xFED3_XXXX (Public Space) 0xFED4_0XXX (TPM Locality 0) | Processor Hardware, VMM, Intel ACM | Unconditionally |
| | Guest OS | If authorized by VMM via CPU page table mechanism |
| 0xFED4_4XXX (TPM Locality 4) | Processor Hardware | Unconditionally |
| | VMM, Intel ACM, Guest OS | Never |

Fig. 3

| Register Name | Description |
|---|---|
| LT.NC.INDEX.ADDRESS | Requestor writes physical address of the register to be accessed here.<br>Just like other LT registers, there is one copy of these registers in LT public space and another copy in private space.<br>The public space copy is used for accessing public space/TPM Locality 0 registers in other nodes. This ensures that requestor can access remote public space registers if and only if it has access to local public space registers.<br>The private space copy is used to access both private space and TPM locality 2 registers. This ensures that requestor can access remote private space registers if and only if it has access to local private space registers. |
| LT.NC.INDEX.NODEID | Requestor writes node ID of the remote node to this register. Special encodings are used to denote short hands like broadcast to all nodes or all nodes except self. |
| LT.NC.INDEX.MYNODEID | Requestor can read this to determine local node ID. This can be used to prevent targeting self etc. |
| LT.NC.INDEX.OPERATION | Requestor uses this register to specify requested operation<br>00 do Nothing<br>01 – Read<br>10 – Write<br>The type of cycle that is used for writing to this register is used for issuing the read/write operation. The cycle type is used to distinguish Processor hardware generated accesses and thus grant special privileges to processor hardware. Processor hardware alone can access TPM locality 4 registers in local node, carrying forward the cycle type allows remote nodes to make the distinction and only grant access to TPM locality 4 is if it sees the special cycle. |
| LT.NC.INDEX.BYTEENABLE | Requestor uses this register to indicate which bytes out of LT.NC.DATA need to be transferred |
| LT.NC.DATA | Data portion of the index/data pair |

Fig. 4

SECURITY MANAGEMENT IN MULTI-NODE, MULTI-PROCESSOR PLATFORMS

FIELD

This application relates generally to information security in computers. In particular, this application relates to securing information in a multi-processor and/or multi-node computer system.

BACKGROUND

Some computer hardware is designed to maintain secret information against software and other attacks. Some computer hardware makes use of hardware hooks in the processors and chipsets to protect memory secrets. Memory secrets may include things like private keys, passwords, personal data etc. for protection from malicious agents. VMM (Virtual Machine Monitor) or the components in the launch environment software can place and remove secrets in system memory. VMM explicitly notifies the hardware about the presence of secrets. VMM manages secrets in memory using a write CMD.SECRETS or CMD.NOSECRETS to hardware protected registers, depending on the presence of memory secrets. Some large server systems with 8-32 processor sockets, run a single copy of VMM, and are assembled by combining several smaller nodes containing 2-4 processor sockets. Each node boots separately to a point in BIOS and is then merged together by system BIOS running on the selected boot or primary node. Node controllers hide the multi-node topology from processors as well as VMMs. In the merged system, only the primary node is actively decoding registers and sets the correct secrets state. Other nodes do not see these commands and will have incorrect information. Each node comes out of reset independently and consults its private copy of SECRETS flag to determine whether to lock memory. Similar issue exists for TPM (Trusted Platform Module) ESTABLISHED flag. These issues may make secrets in these platforms insecure to malicious software.

BRIEF DESCRIPTION OF THE DRAWINGS

The following description can be better understood in light of Figures, in which:

FIG. 3 is a table illustrating exemplary access hierarchy for memory; and

FIG. 4 is a table illustrating exemplary organization of node controller index registers.

Figure 1:
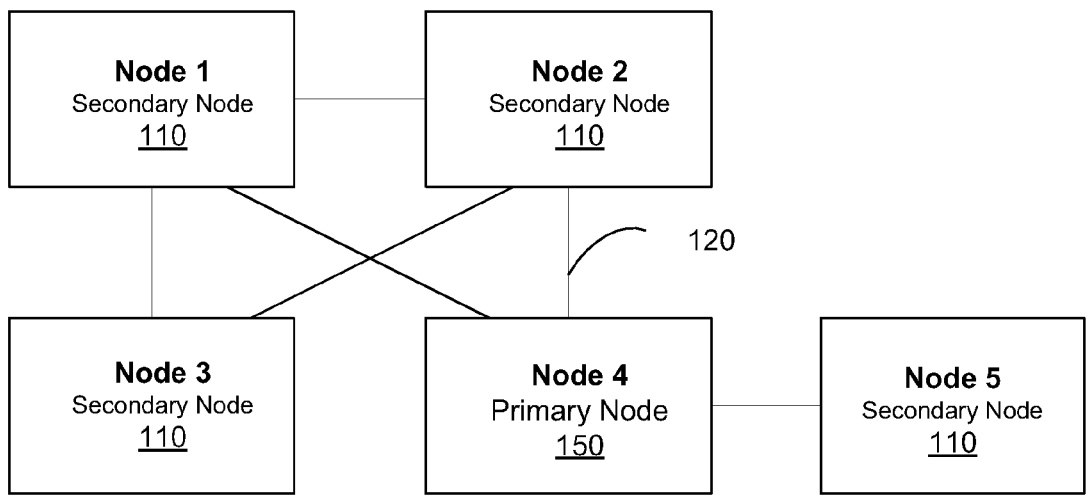
FIG. 1 is a schematic diagram of an exemplary multi-node computer system.

Together with the following description, the Figures demonstrate and explain the principles of the apparatus and methods described herein. In the Figures, the organization and configuration of components may be exaggerated or simplified for clarity. The same reference numerals in different Figures represent the same component.

DETAILED DESCRIPTION

The following description supplies specific details in order to provide a thorough understanding. Nevertheless, the skilled artisan would understand that the methods and processes can be implemented and used without employing these specific details. Indeed, the methods and processes can be placed into practice by modifying the illustrated architecture and organization for secret data protection and associated methods and can be used in conjunction with any computer system and techniques conventionally used in the industry. For example, while the description below focuses on Intel® processor based systems using the LaGrande Technologies (LT) architecture, the organization, processes and associated methods can be equally applied in other computer systems.

Figure 2:
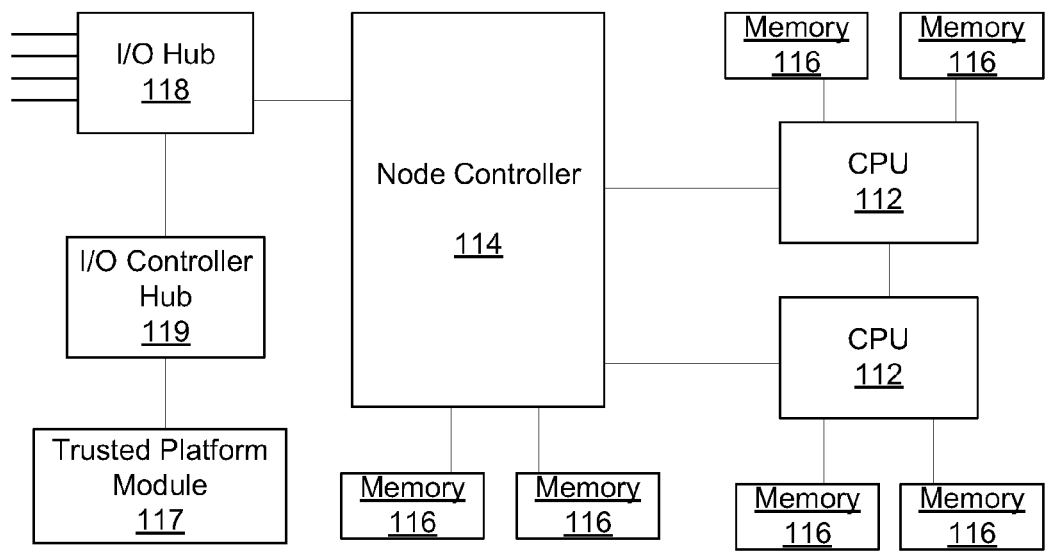
FIG. 2 is a schematic diagram of an exemplary node.

This application describes several embodiments of methods of secret synchronization across a large, multi-node system. The security management systems and methods can have any configuration consistent with operations described herein. One exemplary configuration of multi-node and multi-processor computer system is illustrated in FIGS. 1 and 2. The computer system schematically represented in FIG. 1 may include secondary nodes 110 and primary node 150. The lines linking each of nodes 110 150 represent links between the nodes.

FIG. 2 schematically illustrates secondary node 110. Similarly, FIG. 2 may represent primary node 150 as well. Secondary node 110 may include CPUs 112, node controller 114, memory 116, Trusted Platform Module (TPM) 117, I/O hub 118, and I/O controller hub 119. Node 110 may be connected to other nodes 110 or 150 via connection 120. Connection 120 may be to an Intel QuickPath Interconnect (QPI) bus, or any other bus known to those of ordinary skill. Similarly, each of the components of node 110 may be interconnected using one or more known bus and communications configurations or protocols. For example, I/O hub 118 and CPUs 112 may be connected to node controller 119 using QPI, I/O hub 118 may be connected to I/O controller hub 119 using Enterprise SouthBridge Interface (ESI), and I/O controller hub 119 may be connected to TPM 117 using a low pin count (LPC) bus.

LT makes use of several chipset registers located in I/O Hub 118 and I/O Controller Hub 119. LT also makes use of Trusted Platform Module (TPM). The LT chipset registers are mapped to a fixed, memory mapped, address range 0xFED2_0000 to 0xFED3_FFFF. TPM is mapped to the address range 0xFED4_0000 to 0xFED4_4FFF. Certain sub-ranges of these address ranges only allow privileged software to access these registers and there are hardware hooks in processor/chipset and I/O hub to perform the privilege checking. The VMM has knowledge of these ranges and what they represent and has code to apply necessary protections. Primary node 150 and secondary nodes 110 each have such LT registers and TPM.

FIG. 3 illustrates a table showing an exemplary organizational hierarchy for address locations in various TPMs 117 of nodes 110, 150. The address range 0xFED2_XXXX host chipset registers and is known as the "Private Space". In the table, Private Space may be accessed by the processor hardware at all times; by an Authenticated Code Module (ACM) by authorization from the processor hardware; the VMM by authorization from both the processor hardware and the ACM; and finally, the OS may access this range only if authorized by the VMM, ACM, and the processor hardware. Thus, the chipset, I/O, LT and TPM registers may be protected from access using several layers of request and hardware protections.

Similarly, addresses 0xFED3_XXXX and 0xFED4_0XXX may be accessed by the processor hardware, VMM, and ACM for any reason, and by the OS only if authorized by VMM via CPU page table mechanism. Addresses 0xFED4_4XXX are the most secure and retain secured information that may never be accessed by any agent other than the processor hardware.

Software running on one node may need to be able to access LT and TPM registers in another (remote) node. The scheme that provides access to remote LT and TPM registers may accomplish the following requirements: the secondary node 110 registers may be exposed at alternate addresses and should not overlap primary node 150 registers; accesses to secondary node 110 registers may be protected in manner equivalent to the primary registers (see FIG. 3), e.g., a requester should be allowed to access Private Space registers in secondary node 110 only if it can access Private Space registers in primary node 150; the hierarchy may be scalable to handle large number of nodes; and the hierarchy should not unduly burden the processor and most of the implementation cost may be pushed to node controller 114. Equivalent requirements hold true for the LT registers in I/O Hub 118 and I/O Controller Hub 119, and TPM 117 registers.

In some embodiments, the memory indexing described above may be accomplished by reserving certain LT addresses for node controllers 114, such as 0xFED3_8000-0xFED3_FFFF (Node controller Public space) and 0xFED2_8000-0xFED2_FFFF (Node controller Private space), ensuring that these address ranges would never be used by other LT agents in the future, as these addresses may be unused in some hardware configurations. In some embodiments, use of specific ranges, or a portion of the ranges, propagates the hierarchy rules of FIG. 3 automatically without having to change existing protection logic in processors, chipsets, and VMM software. For example, a Private Space address alone may be used to index into Private Space registers in remote node. This may ensure that only the entity with access granted to Private Space can access Private Space Registers in remote node. Additionally, node controller 114 may implement a set of indexing registers that could be used to access TPM 117 registers in secondary nodes 110. Sample register definition and rationale is shown in FIG. 4. An indexing scheme may be used so that a system with large number of nodes can be supported. Each node controller may be programmed with a unique NC_ID that will assist the hardware to properly claim the accesses on the QPI bus.

Since platform specific software merges all CPUs 112 and nodes 110, 150 to function virtually as a single node and masks the existence of the multi-node nature of the physical topology from VMM, it may be important to ensure that each TPM 117 reflects the appropriate data state. To synchronize the information across all nodes 110, 150 ensuring that all TPMs 117 reflect the appropriate state indicating the presence of protected data, write commands may be broadcast to CMD.SECRETS and CMD.NOSECRETS registers to all nodes 110, 150 in such a way that it reaches all ICHs 119, and thus TPMs 117, even the inactive ones.

This can be done in variety of ways. One way may be using node controller 114 hardware to trap the needed write commands to the addresses and broadcast them to each node 110. A microcontroller that is part of node controller 114 may be used to perform the trapping and the broadcast. Another way may be to have node controller 114 generate a System Management Interrupt (SMI) when a write to CMD.SECRETS and CMD.NOSECRETS is observed. The SMI handler that is running on host CPUs, update the state in every ICH 119. The SMI handler can use a scheme like the indexing scheme described above to write ICH 119 in secondary nodes 110. Another way may be to make the VMM aware of the multi-node nature of the platform and issue write to each ICH 119 using the indexing scheme described above.

Similarly, an ESTABLISHED flag may be propagated to all TPMs 117 including the inactive ones using variety of mechanisms. One mechanism may be to use the TPM HASH_START command. HASH_START command involves various write commands to addresses in the fixed range 0xFED4_4020-0xFED4_402F. Node controller 114 in any of nodes 110, 150 can broadcast these write commands in the correct order to all other node controllers 114 in such a way that it reaches all TPMs 117, even the inactive ones. The ACM or VMM may also set ESTABLISHED flag via a dedicated command that TPMs 117 understand.

Some large platforms support hot addition of nodes (hot node), where one or more secondary nodes 110 may be added to a system that is already running a VMM without bringing the system down. In some embodiments, the SECRETS flag in ICH 119 and ESTABLISHED flags in the TPM 117 of the newly added hot node or nodes may be set correctly using the mechanisms described above. Similarly, in some embodiments some large platforms may support removing a node, where one or more secondary nodes 110 may be deleted from a system that is already running a VMM without bringing the system down. The same techniques described here can be used for the proper management of SECRETS and ESTABLISHED flags.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

The invention claimed is:

1. A method for security in a multi-CPU computer system, comprising:
    providing a plurality of nodes, each node including:
        a trusted platform module,
        at least one CPU, and
        a node controller;
    establishing one of the plurality of nodes as a primary node; and
    broadcasting a security command from the primary node to the trusted platform module within each of the plurality of nodes, wherein the security command is associated with secret data stored at a secured register address within a first sub-range of secured register addresses, wherein registers within the first sub-range of secured register addresses are protected from improper access by hardware adapted to perform a privilege check, and registers within a second sub-range of secured register addresses can only be accessed: (i) by processor hardware, and (ii) by an Authenticated Code Module (ACM) authorized by the processor hardware, and (iii) by a Virtual Machine Monitor (VMM) authorized by both the processor hardware and the ACM, and (iv) an Operating System (OS) authorized by all of the processor hardware, the ACM, and the VMM.

2. The method of claim 1, wherein the secured register address is in the range of 0xFED4_4020 to 0xFED4_402F.

3. The method of claim 1, wherein the security command is one of HASH_START, or associated with a system managed interrupt event.

4. The method of claim 1, further comprising,
    determining if secret information is located in memory associated with any of the plurality of nodes.

5. The method of claim 4, wherein the security command informs each of the plurality of nodes whether secret information is located in the memory associated with any of the plurality of nodes, wherein the secret information is associated with at least one of a SECRETS flag or an ESTABLISHED flag.

6. The method of claim 1, wherein the plurality of nodes are managed by the VMM such that the plurality of nodes are presented as a single PC-AT compatible hardware platform and associated chipsets.

7. The method of claim 1, wherein the node controller in the primary node is configured to access registers associated with each of the plurality of nodes, wherein one of the plurality of nodes is a hot added node, and wherein the primary node is configured to coordinate SECRETS and ESTABLISHED flag between each of the plurality of nodes.

* * * * *